Dec. 19 1922.

M. L. SCHLUETER,
TIRE FOR VEHICLE WHEELS,
FILED OCT. 25 1920.

1,439,485

Witness:
Stephen T. Rebra

Inventor:
Max L. Schlueter,
by Chamberlin & Freudenreich
Attys

Patented Dec. 19, 1922.

1,439,485

UNITED STATES PATENT OFFICE.

MAX L. SCHLUETER, OF CHICAGO, ILLINOIS.

TIRE FOR VEHICLE WHEELS.

Application filed October 25, 1920. Serial No. 419,165.

*To all whom it may concern:*

Be it known that I, MAX L. SCHLUETER, a citizen of the United States, residing at Chicago, county of Cook, State of Illinois, have invented a certain new and useful Improvement in Tires for Vehicle Wheels, and declare the following to be a full, clear, and exact description of the same, such as will enable others skilled in the art to which it pertains to make and use the same, reference being had to the accompanying drawings, which form a part of this specification.

The usual tires employed on automobiles, while satisfactory when running over hard roads or pavements, do not meet the requirements of soft ground, for the reason that the tires sink deeply into the soft ground and place an undue load on the motor.

The object of the present invention is to produce a simple and novel tire which will present the comparatively narrow tread surface, in running over hard roads or pavements, that automobile tires now usually have and, when running over soft ground, will present a much wider tread surface so as to prevent it from sinking deeply into the ground.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1:
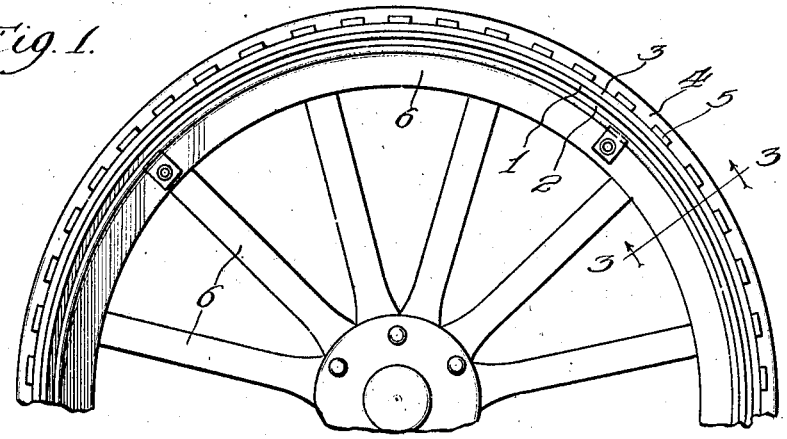
Figure 1 is a side elevation of half of an automobile wheel equipped with a tire made in accordance with the present invention.
Figure 2:
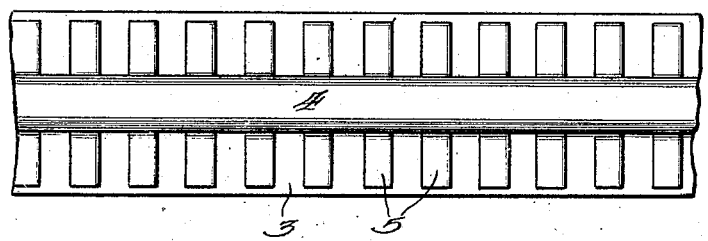
Fig. 2 is a developed elevation or view of the tread surface of the tire.
Figure 3:
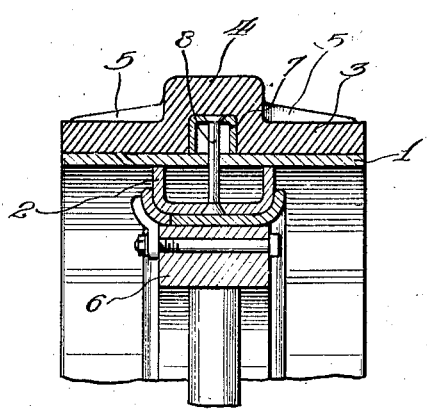
Fig. 3 is a section, on an enlarged scale, taken approximately on line 3—3 of Fig. 1.

Referring to Figs. 1 to 3 of the drawing, 1 represents a cylindrical metal shell or rim which may be two or three or more times as wide as the effective tread surface of a pneumatic automobile tire of the same diameter. In the interior of the member 1, midway between the side edges, is an annular projection, 2, which may take the shape of the demountable rim of an automobile wheel. Surrounding and lying in close contact with the member 1 is a cushioning band or layer, 3, preferably of rubber. The middle portion of the member 3 is made considerably thicker than the remainder so as to provide an annular projection, 4, which will present to the road a tread surface of sufficient width where the road is hard. When soft ground is encountered the projection 4 will sink into it until the wide side portions of the member 3 rest upon the ground, giving an effective tread surface several times as great as that presented by the element 4. The member 3 is preferably provided with ribs or projections, 5, on opposite sides of and lower than the member 4, so that, when soft ground is encountered, better traction will be obtained than would be the case if the low portions of the member 3 were left smooth. The combined rim and tire may be demountably placed on any usual or preferred wheel center, 6, which may include a standard rim and fastening means, as shown, so that it may be placed in position and taken off in the same manner as a demountable rim and tire of ordinary form. By extending the member 1 across the entire width of the member 3, the load is effectively distributed across the whole tread surface when soft ground is encountered whereas, if the side portions of the member 3 were not backed with metal they would yield under the load and detract from the efficiency of the device.

My improved tire and rim may be built up in any suitable way. In the arrangement shown in Fig. 3, the member 1 is a simple short cylinder within which fits a ring, 2, channel-shaped in cross section, and surrounding which is a smaller ring, 7, also channel-shaped; the members 1, 2 and 7 being tied together by means of rivets or bolts, 8, passing through the same. The cushioning member 3 is then vulcanized directly upon the metal. It will be seen that the member 7 projects outwardly into the body of the rubber and thus serves positively to hold the rubber against displacement in the lateral direction.

Figure 4:
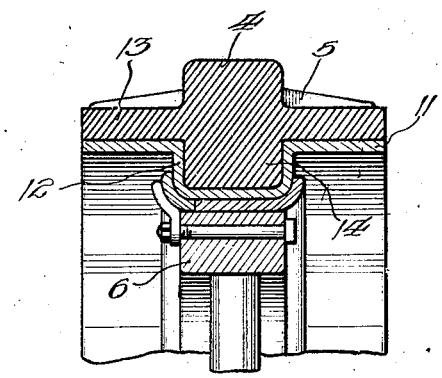
Fig. 4 is a view similar to Fig. 3, illustrating a modification.

In the arrangement shown in Fig. 4, the member 11, corresponding to the member 1, and the member 12, corresponding to the member 2, are made integral with each other; the members 11 and 12 together constituting a ring U-shaped in cross section and having wide peripheral flanges. The member 13 has the same external appearance as the member 3 but is provided on the inside thereof with a heavy annular rib or projection, 14, of approximately the same width as the raised middle portion, 4, which fits into the channel-shaped part, 12, of the rim. In this form of my invention the normal tread surface at the periphery of the raised middle portion, 4, is backed by a much deeper body of rubber than in the other form, and the cushioning effect, while running over hard surfaces, will therefore be greater than in the other form.

While I have illustrated and described with particularity only a single preferred form of my invention together with a slight modification, I do not desire to be limited to the exact structural details thus illustrated and described; but intend to cover all forms and arrangements which come within the terms employed in the definitions of my invention constituting the appended claims. Furthermore, while I have referred only to automobile wheels it will be evident that my invention is applicable to vehicle wheels in general.

I claim:

1. A device of the character described comprising a wide flat metal rim having a central inwardly-projecting portion adapted to fit upon a wheel rim, and a cushioning layer surrounding the rim and having a central raised portion approximately equal in width to said inwardly-projecting portion on the rim.

2. A device of the character described comprising a demountable rim having a peripheral portion much wider than the body portion, and a cushioning layer surrounding said peripheral portion, said cushioning layer having side tread surfaces and a central raised portion provided with a tread surface at its periphery.

In testimony whereof, I sign this specification.

MAX L. SCHLUETER.